Jan. 3, 1961 S. C. MOON 2,966,984
PORTABLE CONVEYOR APPARATUS
Filed Sept. 15, 1955 3 Sheets-Sheet 2
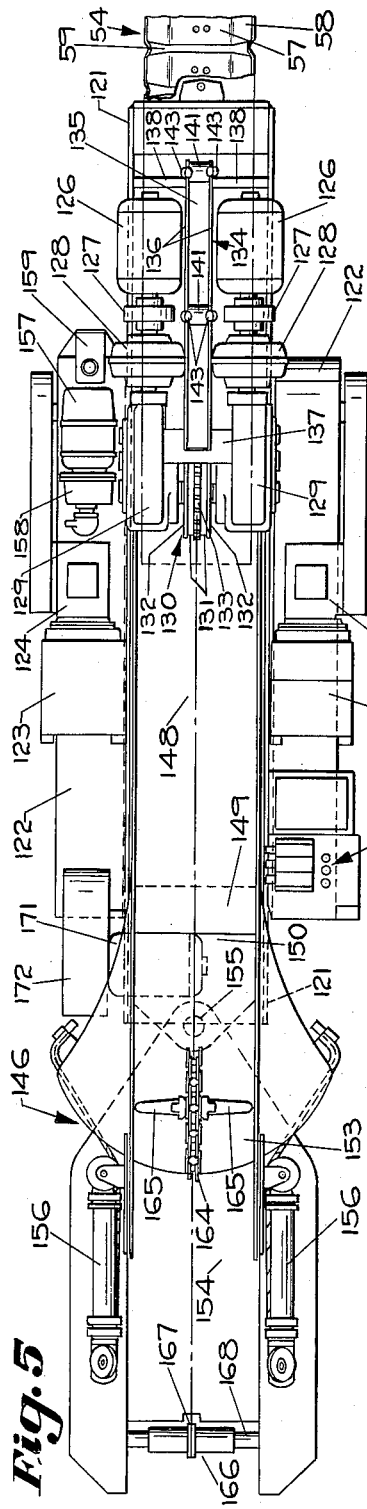
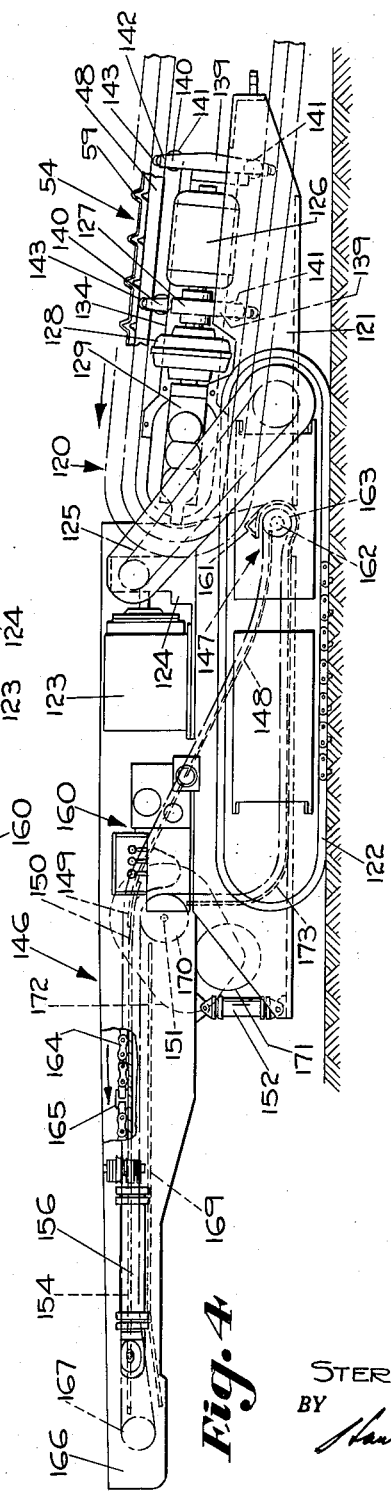
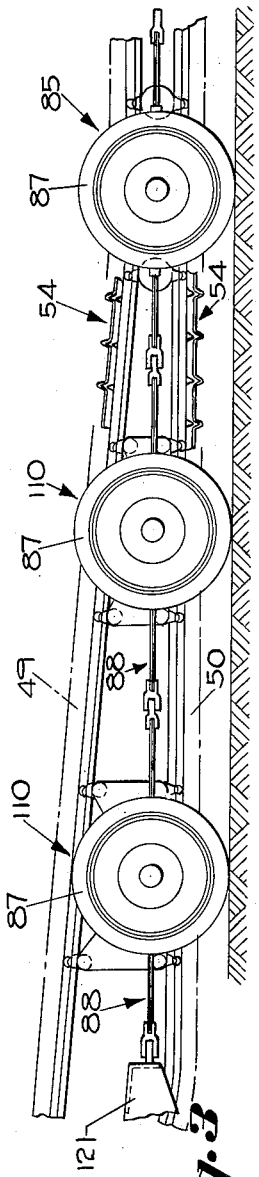
INVENTOR;
STERLING C. MOON,
BY
ATT'Y Jan. 3, 1961 S. C. MOON 2,966,984
PORTABLE CONVEYOR APPARATUS
Filed Sept. 15, 1955 3 Sheets-Sheet 3
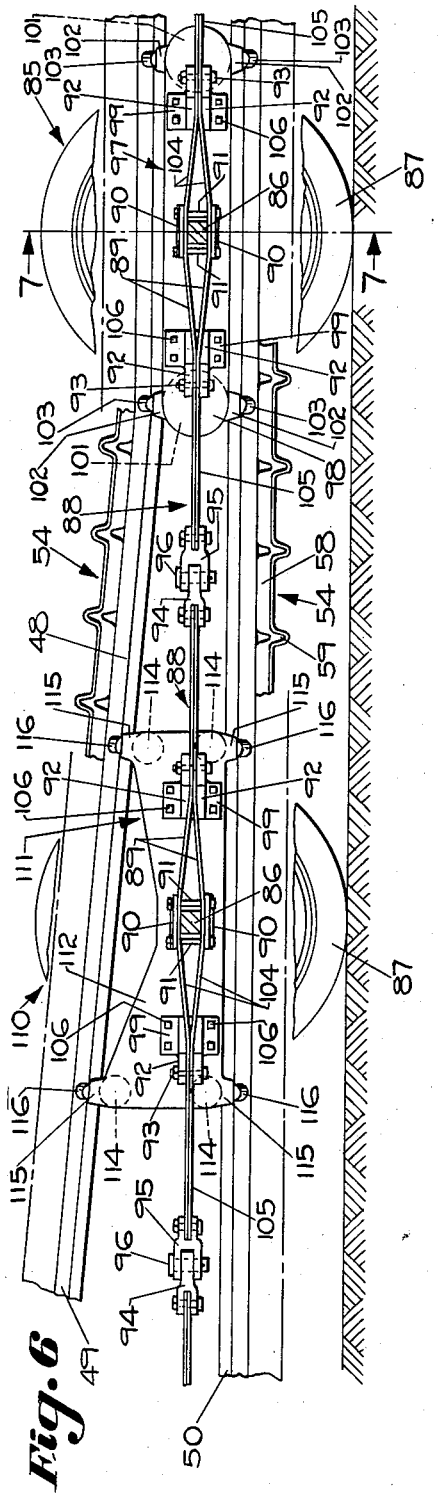
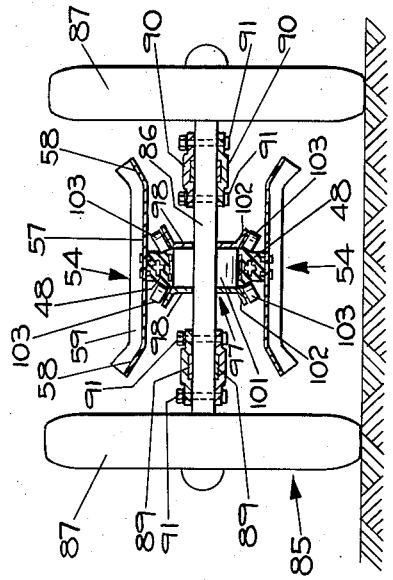
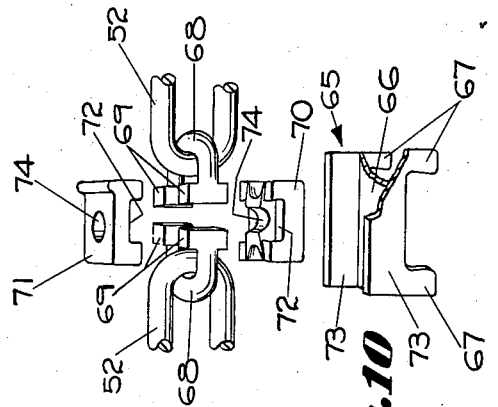
INVENTOR:
STERLING C. MOON,
BY
ATT'Y.

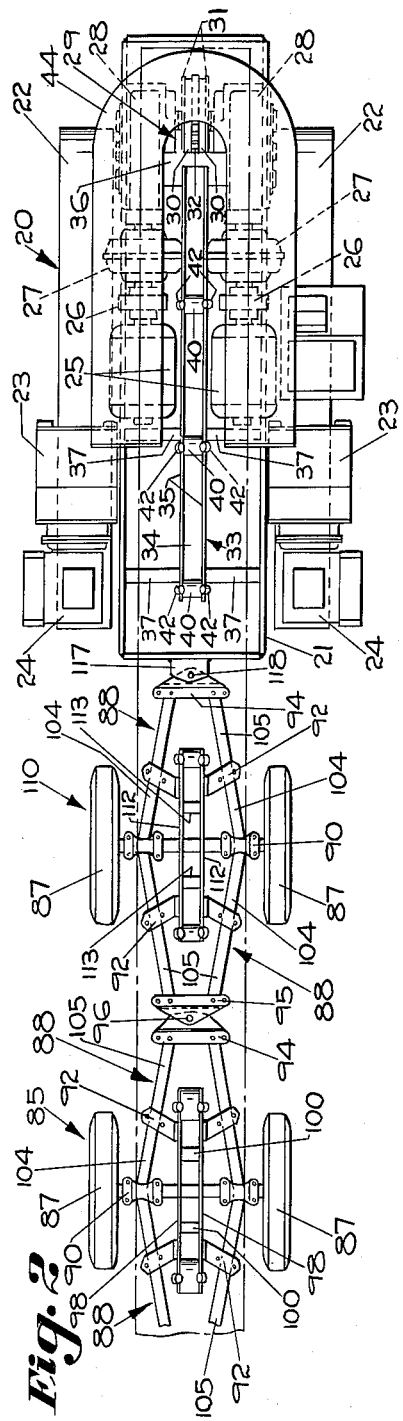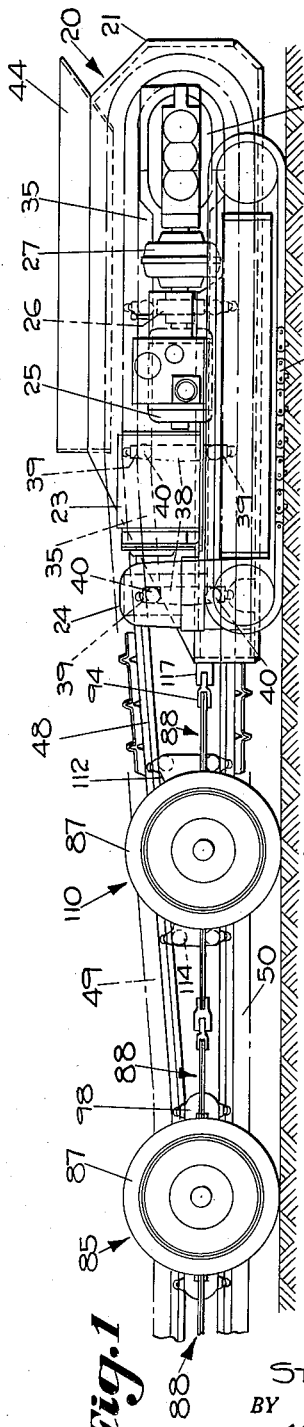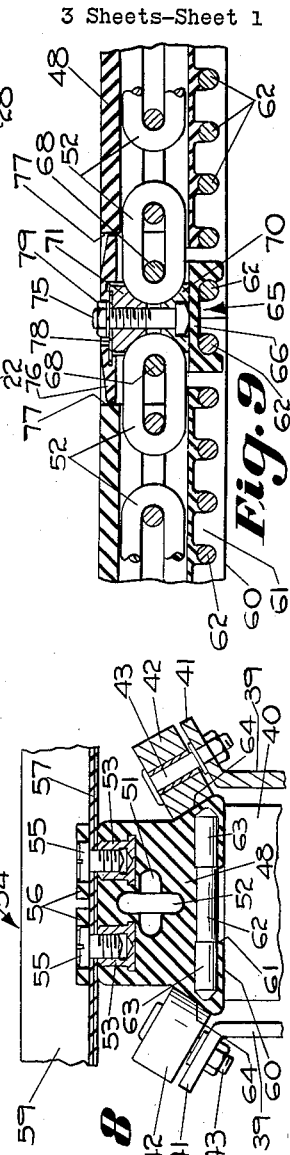
INVENTOR;
STERLING C. MOON,
BY
ATT'Y.

United States Patent Office 2,966,984
Patented Jan. 3, 1961

2,966,984

PORTABLE CONVEYOR APPARATUS

Sterling C. Moon, Dublin, Ohio, assignor to The Jeffrey Manufacturing Company, a corporation of Ohio Filed Sept. 15, 1955, Ser. No. 534,589

2 Claims. (Cl. 198—109)

The instant invention relates to conveyor apparatus which is adapted to follow a winding path from the point at which the material is loaded onto the conveyor to the point at which the conveyor discharges the material for removal.

It is an object of the instant invention to provide a conveyor apparatus, which is adapted to follow a winding path, the belt being supported and guided by means mounted on individual trucks connected one to the other in a train, the trucks being adapted to assume positions in the winding path and the guide means on the trucks conforming the belt to the winding path.

It is a further object of the instant invention to provide a conveyor apparatus adapted to follow a winding path in which there is provided an endless carrier belt entrained over a pair of pulleys one located at the loading end of the apparatus and another located at the discharge end of the apparatus, the belt running in a material conveying flight extending from the loading end to the discharge end of the apparatus and a return flight extending from the discharge end to the loading end of the apparatus, the belt being guided in the flights by means carried on trucks which are adapted to assume positions in a winding path to conform the belt to that path.

It is another object of the instant invention to provide a portable conveyor apparatus comprising a carrier belt guided in its flights by guide means supported on trucks which are connected one to the other in a train, said trucks being adapted to assume positions in a winding path with the guide means on the trucks conforming the belt to the winding path, and including mobile means supporting each of the trucks, and power-driven traction means for propelling the conveyor to an operating location.

It is also an object of the instant invention to provide a conveyor apparatus including a loading station and a discharge station with a carrier belt extending therebetween, said carrier belt being guided by guide means on trucks which are adapted to assume positions in a winding path with the guide means conforming the belt to the winding path, the discharge station of the apparatus including a discharging conveyor adapted to receive material discharging from the carrier belt, said discharging conveyor including a boom extending rearwardly from the discharge station and mounted for adjustment in vertical and horizontal planes to selectively direct the discharge of the material.

It is still another object of the instant invention to provide a conveyor apparatus adapted to follow a winding path in which there is provided a carrier belt guided in its run by guide means mounted on trucks that are adapted to assume positions in the winding path, the guide means on the trucks conforming the belt to the winding path, and articulated means connecting the trucks one to the other in a train for permitting the trucks to assume positions in the winding path, said trucks further including drawbars extending between the articulated connecting means, a portion of said drawbars being flexible and permitting the successive trucks in the train to assume vertically spaced positions with respect to each other.

Other objects of the invention will appear hereinafter, the novel features and combinations being set forth in the appended claims.

In the accompanying drawings:

Fig. 1 is an elevational view of the loading station of the novel conveyor apparatus showing several of the trucks for guiding and supporting the carrier belt;

Fig. 2 is a top plan view of the portion of the conveyor apparatus shown in Fig. 1;

Fig. 3 is a side elevational view of several of the carrier belt guiding and supporting trucks approaching the discharge station of the conveyor apparatus;

Fig. 4 is an elevational view of the discharge station of the novel conveyor apparatus including a showing of the discharging conveyor;

Fig. 5 is a top plan view of the portion of the conveyor apparatus shown in Fig. 4;

Fig. 6 is a vertical sectional view of several of the trucks;

Fig. 7 is a sectional view of a truck taken on the line 7—7 in Fig. 6;

Fig. 8 is a vertical sectional view through the carrier belt illustrating the mode of securing the material carrying pans thereto and showing the engagement of the lateral guide rollers with the belt;

Fig. 9 is a vertical sectional view through the carrier belt at a junction point between two sections of the belt; and Fig. 10 is an exploded view of the carrier belt coupling elements illustrated in Fig. 9.

Referring to Figs. 1 and 2 of the drawings, the novel conveyor apparatus of the instant invention comprises a loading station generally indicated at 20 and comprising the main supporting frame 21 which may be of welded plate construction. Carried by the main supporting frame 21 is a pair of endless crawler traction elements 22 located one at either side of the main supporting frame 21. A pair of crawler driving motors 23, one for each of the traction elements 22 is supported on the main frame 21 above the traction elements, and are each individually connected to the traction elements 22 through suitable gear reduction means 24. The driving motors 23 may be energized together to drive both of the traction elements 22 for the purpose of propelling the conveyor apparatus as will appear in greater detail below.

The main supporting frame 21 at the loading station 20 further includes twin driving units for the conveying means, these units being located one at either side of the main supporting frame 21. The driving units for the conveying means each comprises a suitable motor 25 having its armature shaft connecting to a flexible coupling 26 which connects to a fluid coupling 27 which, in turn, is connected to suitable gear reduction means 28 for driving the conveyor. The gear reduction means 28 have their output shafts extending towards each other with a conveyor driving pulley 29 mounted thereon, the motors 25 supplying the power to drive the pulley 29. The conveyor driving pulley 29 comprises laterally spaced carrier belt bearing surfaces 30 adapted to engage the underside of the conveyor carrier belt. Lateral guiding means in the form of peripheral flanges 31, disposed one on each side of driving pulley 29 adjacent the bearing surfaces 30, is provided for guiding the carrier belt on the pulley 29. Intermediate the bearing surfaces 30 there is provided a belt engaging sprocket gear 32 which drives the carrier belt.

The loading station 20 further includes a terminal guiding structure 33 for the carrier belt of the conveying apparatus. This carrier belt guiding structure 33 comprises a centrally disposed, longitudinally extending frame 34 aligned with and extending rearwardly of the driving pulley 29 and having a pair of opposed side plates 35 secured in spaced relation on the main supporting frame 21. The ends of the side plates 35 adjacent to the driving pulley 29 are secured to a transversely extending supporting member 36, the supporting member 36 being in turn secured to the main supporting frame 21 and holding the one end of the terminal guiding structure 33 in longitudinal alignment with the driving pulley 29. The other end of the frame 34 includes transverse braces 37 extending between the side plates 35 and the main supporting frame 21, the braces 37 being secured at their outer ends to the main supporting frame 21 to hold the end of the terminal guiding structure 33 in proper alignment for guiding the carrier belt to and from the driving pulley 29.

On the outwardly facing surface of each of the side plates 35, there are secured, in any suitable manner, three vertically extending, elongated plate members 38. On each of the side plates 35 the plate members 38 are secured one at the end of the frame 34 furthest from the driving pulley 29, and the other two plate members 38 are spaced at equal intervals therefrom towards the driving pulley 29. It will be seen that the elongated plate members 38 extend vertically above and below the top and bottom edges, respectively, of the side plates 35 of frame 34 to provide six pairs of ears 39. Between the ears 39 of each pair there is journalled a freely rotatable carrier belt supporting roller 40 rotatably mounted on a horizontal axis extending transversely with respect to the terminal guiding structure 33. The ends of the ears 39 are flared outwardly from the frame 34 forming supports 41 for lateral guiding rollers 42 (see Fig. 8) which are rotatably mounted on stub shafts 43 bolted to the supports 41. The stub shafts 43 provide axes for the lateral guiding rollers 42 which are inclined from the vertical towards each other in a plane transverse to the terminal guiding structure 32. The lateral guiding rollers 42 are mounted for free rotation on the shafts 43 and are adapted to engage lateral surfaces of the carrier belt to constrain the latter against lateral displacement as will appear in greater detail below.

The loading station further includes a material receiving hopper 44 having walls inclined downwardly towards each other, and having the form of a horseshoe, for the reception of material dumped therein, said material being thereby guided to the carrier belt for movement by the conveyor apparatus.

The novel conveyor apparatus utilizes an endless carrier belt 48 preferably made with a rubber body so as to be flexible in all directions. The carrier belt 48 is entrained over the conveyor driving pulley 29 in the loading station and extends therefrom towards the discharge station in an upper material conveying flight 49 and a lower return flight 50. The carrier belt is of a molded construction and is formed with a longitudinally extending hollow section 51 located substantially centrally of the belt cross section and having a section in the form of a cross, as best seen in Fig. 8. A steel coil chain 52 of the type having the links thereof disposed in planes at right angles with respect to each other is threaded through the body of the carrier belt 48 and is disposed in the hollow section 51. The chain 52 is provided for the purpose of relieving the body of the carrier belt 48 from tension as it is driven in its flights.

The carrier belt 48 further has threaded inserts 53 which are molded into the body of the belt and open into the upper surface thereof. Material carrying pans 54 are secured to the carrier belt 48 on the upper surface thereof and extend transversely of the belt for carrying the material. Each of the material carrying pans 54 is secured to the carrier belt 48 by a pair of bolts 55 threaded into the inserts 53 provided below the upper surface of the carrier belt 48. Raised bosses 56 surround the heads of the bolts 55 and prevent damage thereto. The material carrying pans 54 comprise a rigid, substantially flat pan portion 57 with upwardly directed side edges 58 for retaining the material in the pans. A flexible connecting rib 59 connects the successive pans in the train, so that the successive pans 54 may follow each other in an irregular winding path with the flexible connecting ribs 59 yielding in all directions to permit the pans 54 to follow the path. The material carrying pans 54 disclosed herein are constructed in accordance with the invention of U.S. Patent No. 2,701,050 assigned to F. K. H. Stubbe. Thus, it is seen that the carrier belt 48 is capable of bending in all directions to follow a winding path, and the material carrying pans 54 which are secured to the carrier belt 48 are likewise capable of following the winding path, being carried between the loading station 20 and discharge station 120 of the conveyor apparatus on the driven carrier belt 48.

The carrier belt 48 further includes a flat under-surface 60 extending longitudinally of the belt along each edge of the underside of the belt. The longitudinally extending surfaces 60 are adapted to ride on the bearing surfaces 30 of the driving pulley 29, the carrier belt 48 being guided thereby at the end of the path. The peripheral flanges 31 at each side of the driving pulley 29 are adapted to engage the edges of the carrier belt 48 to retain the same on the surfaces 30 in proper alignment therewith. The flat under-surfaces 60 are separated by a longitudinally extending gap 61 spanned by laterally extending pins 62 made of steel or similar wear-resistant material. Each of the pins 62 is formed with enlarged ends 63 which are embedded in the carrier belt 48 directly above the flat under-surfaces 60 thereof. In the manufacture of the carrier belt 48 the pins 62 and the threaded inserts 53 are molded into the body of the carrier belt so as to become a component part thereof. The pins 62 extend laterally of the gap 61 intermediate the under-surfaces 60 and are evenly spaced along the entire length of the carrier belt 48. The embedded pins 62 in conjunction with the flexible body of the carrier belt 48 form a flexible rack which follows the periphery of the driving pulley 29, the pins 62 being engaged by the teeth of the sprocket gear 32 for transmission of the driving force to the carrier belt 48.

The flat under-surfaces 60 on the underside of the carrier belt 48 merge with downwardly and outwardly inclined lateral surfaces 64 on each side of the carrier belt. In the upper material conveying flight 49 of the carrier belt 48, the flat under-surfaces 60 bear against the peripheries of the carrier belt supporting rollers 40, the latter supporting the weight of the belt with the material carried in the pans 54. The inclined lateral surfaces 64 of the belt 48 are engaged by the lateral guiding rollers 42 for restraining the belt 48 from lateral movement out of its path. In the lower return flight 50 of the carrier belt 48, the rollers 40, 42 similarly engage and guide the carrier belt to maintain it in the desired path.

The carrier belt 48 is preferably made in short sections so that as many sections as may be needed can be joined in end to end relationship, to form any desired total length of the carrier belt. A junction between two such sections of the carrier belt 48 is illustrated in Fig. 9. The pin 62 at each end of the carrier belt sections is exposed on its entire periphery, since the material of the carrier belt 48 is removed at the end of the section to provide an opening 77 for the coupling means. A linking saddle 65 is formed with a web portion 66 overlying the end pins 62 at the adjoining ends of the carrier belt sections and includes legs 67 which embrace the pins 62 maintaining them spaced one from the other the same distance as that between the remaining pins 62 in the carrier belt sections. With the end pins 62 so disposed, the ends of the carrier belt sections abut each other, and the end pins 62 are properly spaced to be engaged by the teeth of the sprocket gear 32.

The tension relieving chain 52 is similarly formed in sections having the same length as the sections of the carrier belt 48. At the end of each chain section there is provided a half-link 68 with block ends 69, which block ends on the adjacent half-links 68 are adapted to abut each other for connecting the adjacent sections of the carrier belt 48. A bottom coupling element 70 is formed with suitable cutout areas for the reception of the chain links and the block ends 69 on the half-links 68. A similarly formed upper coupling element 71 overlies the bottom coupling element 70 and is similarly formed for the reception of the chain half-links 68 and the block ends 69. When the bottom and upper coupling elements 70, 71 are assembled one above the other, the block ends 69 of the adjacent half-links 68 are clamped therebetween in the square pockets 72 joining the chain sections and the adjacent sections of the carrier belt 48.

The bottom coupling element 70 is fitted on the web portion 66 of the linking saddle element 65 between the walls 73 thereof. Both the coupling elements 70, 71 are formed with a vertical bolt hole 74 through which is passed a bolt 75 with the threads thereof directed towards the upper surface of the carrier belt 48. It will be apparent that the bolt 75 passes intermediate the block ends 69 on the half-links 68. A plate member 76 lies within the openings 77 in the ends of the adjacent carrier belt sections through which the coupling elements are assembled. The plate member 76 seals the openings 77. A washer element 78 is molded into the plate member 76 and the nut 79 threaded onto the bolt 75 is tightened against the washer 78. The plate member 76 bears against the sides of the openings 77 whereby the driving force applied to the carrier belt 48 is transmitted through the plate member 76 to the belt coupling means and thence to the chain 52 which acts to relieve the belt 48 of the tension due to the driving force. Thus, it is seen that the adjacent sections of the carrier belt are coupled one to the other without sacrificing any of the flexibility in the run of the belt, so that there is no restriction on the belt in conforming to irregular winding paths. The carrier belt 48 as such does not constitute the invention claimed herein, and is constructed in accordance with the structure utilized in the conveyor system known as the Stubbe "Foldbelt."

The equally spaced pins 62 on the under-surface of the carrier belt 48 are engaged by the teeth of the sprocket gear 32 carried on the driving pulley 29. Engagement of the sprocket gear 31 with the pins 62 drives the carrier belt 48 through its respective flights, driving the carrier belt 48 away from the loading station 20 towards the discharge station of the machine. As the carrier belt passes around the periphery of the driving pulley 29, the material carrying pans 54 are fed in below the loading hopper 44 so that the material dumped into the hopper 44 falls onto the material carrying pans 54 whereby the material is removed from the loading station and conveyed through the upper material conveying flight 49 of the carrier belt to the discharge station 120 of the apparatus.

From the loading station 20 the carrier belt 48 is guided in its upper material conveying flight 49 and its lower return flight 50 by a series of articulated trucks 85 connected one to the other in a train which extends between the loading station 20 and the discharge station 120. The trucks in the train are of two types one of which, shown at 85, guides the carrier belt 48 maintaining the upper and lower flights 49, 50 parallel to each other, while other of the trucks (three in number), located one adjacent the loading station 20, and two adjacent the discharge station 120, are designated approach trucks 110 which guide the upper material conveying flight 49 of the carrier belt 48 in a downwardly inclined path from the loading station 20 and an upwardly inclined path towards the discharging station 120. Through the use of the approach trucks 110 the carrier belt 48 in its material conveying flight 49 is raised to the proper height for driving engagement with the conveyor driving pulleys 29, 130 at the loading station 20 and discharging station 120, respectively.

Each of the trucks 85 guiding the upper and lower flights 49, 50 of the carrier belt 48 in parallel runs, includes a square axle 86 formed with shaft ends on each of which is journalled a truck-supporting wheel 87 permitting movement of the trucks in the train. Drawbars 88 are provided for connecting the trucks one to the other, tying the trucks together in a train and providing for transmission of a force for moving the conveyor to an operating location. The truck 85 has a drawbar 88 on either side thereof. Each drawbar 88 comprises a pair of flat strips of spring material 89, one such strip 89 being disposed on each side of the square axle 86. Straps 90 are disposed one on the top and one on the bottom of the axle 86 for securing the drawbar strips to the axle 86 between the straps 90 and the axle 86. Bolts 91 secure the straps 90 in position over the drawbar strips 89. A short distance from the square axle 86 on either side thereof the pair of strips 89 forming each of the drawbars 88 on the truck 85 are clamped together by brackets 92. To clamp the drawbar strips 89 together at each of the four positions, there is provided a pair of brackets 92, located one on each side of the drawbar 88. Bolts 93, one on each side of the drawbar strips 89, pass through each pair of brackets 92 to secure them onto the drawbars 88 and clamping the drawbar strips 89 together.

The drawbars 88 converge towards each other as they extend from the axle to the end of the truck. At the one end of the truck 85 there is bolted to the adjacent ends of the drawbars 88 a coupling plate 94, and at the other end of the truck 85 there is bolted to the adjacent ends of the drawbars 88 a coupling yoke 95. It will be apparent that successive trucks in the train may be attached one to the other by engagement of the coupling plate 94 between the arms of the coupling yoke 95, the coupling elements including aligned bores for the reception of a pin 96 to form an articulated connection between each of the trucks to permit the trucks to assume positions in a winding path through which the conveying carrier belt 48 is guided.

The truck 85 further includes a belt guiding structure 97 comprising opposed side plates 98 with spacers 100 therebetween to which the side plates 98 may be secured in any suitable manner for maintaining them in properly spaced relation with respect to each other. It will be apparent that the square axle 86 passes through the side plates 98 of the belt guiding structure 97 and for this purpose the plates are formed with square apertures to permit the passage of the axle 86 therethrough. The carrier belt guiding structure 97 is secured in a fixed position on the truck 85 by the brackets 92. Each of the brackets 92 includes a right angle portion 99 abutting the outwardly facing sides of the plates 98. Bolts 106 secure the plates 98 to the brackets 92 which, in turn, secure the carrier belt guiding structure 97 to the drawbars 88 which are rigidly mounted on the square axle 86.

At each end of the carrier belt guiding structure 97 there is provided a large diameter carrier belt supporting roller 101 which is freely journalled between the opposed side plates 98 on a horizontal axis. The side plates 98 further include a plurality of ears 102 extending upwardly and downwardly therefrom in alignment with the vertical plane passing through the axis of the carrier belt supporting roller 101. The ears 102 are bent outwardly from the planes of the plates 98 to form supports for a plurality of lateral guiding rollers 103 each of which is journalled thereon on an axis which is inclined from the vertical towards the center of the belt guiding structure 97. The association of the carrier belt supporting rollers 101 and the carrier belt lateral guiding rollers 103 with the carrier belt is the same as that of the corresponding rollers included in the terminal guiding structure 33, and reference may be had to Fig. 8 for the showing of the cooperative relation between the rollers and the carrier belt 48.

The portion 104 of the drawbars 88, which extends between the straps 90 on the square axle 86 and the clamping brackets 92 on either side of the square axle 86, forms a rigid non-yieldable structure which supports the belt guiding structure 97 in the manner described above. The portion 105 of the drawbars 88, which extends beyond the clamping brackets 92 is resilient, and can flex in a vertical plane. Thus, adjacent trucks 85 in the train are capable of assuming positions which are vertically spaced one with respect to the other as will occur where the terrain on which the conveyor apparatus is supported is rough and uneven. Accordingly, the trucks in the train can assume discrete positions in a winding path in either horizontal or vertical planes, and thereby conform the carrier belt 48 of the conveying apparatus to that winding path to carry material therethrough. The material carrying pans 54 which are secured to the carrier belt 48 likewise follow the winding path in which the trucks are disposed, the flexible connecting ribs 59 between each of the material carrying pans 54 permitting the pans to follow the winding path.

The approach truck 110, located adjacent to the loading station 20 of the novel conveyor apparatus, is coupled thereto by a coupling plate 94 received between the arms of a yoke 117 secured to the main frame 21, a pin 118 connecting the coupling plate 94 to the yoke 117 and providing an articulated connection. The approach truck 110 is generally identical with the truck 85 except insofar as the features of the belt guiding structure 111 are concerned. Accordingly, where the parts in the respective trucks 85, 110 are identical the same reference numerals are used and reference may be had to the discussion of the truck 85 for a description of the structure.

In the approach truck 110 the belt guiding structure 111 comprises opposed side plates 112 spaced apart by spacers 113 to which the plates 112 are secured. The vertical dimension of the plates 112 is seen to exceed the vertical dimension of the plates 98 in the truck 85, and this vertical dimension of the plates 112 increases towards the loading station 20. Thus, in Fig. 1, it is seen that the lower edges of the plates 112 are in a horizontal plane coincident with the lower edges of the plates 98 in truck 85 whereby the carrier belt 48 is guided in its return flight 50 by said trucks in a horizontal plane which is tangent to the periphery of the driving pulley 29. The diameter of the driving pulley 29 is of such size that the carrier belt 48 is raised a distance exceeding the vertical dimension of the belt guiding structure 97 on the truck 85. Accordingly, the belt guiding structure 111 on the truck 110 for guiding the material conveying flight 49 of the carrier belt 48 is inclined downwardly away from the loading station 20 to bring the carrier belt down to the level of the belt guiding means on the truck 85.

The belt guiding structure 111 on the truck 110 is provided with four carrier belt supporting rollers 114 located one adjacent each corner of the structure as best seen in Fig. 6. Each of the supporting rollers 114 is freely journalled between the opposed plates 112 on horizontal axes. At each of the corners of the side plates 112 above and below the respective belt supporting rollers 114, the plates 112 are formed with ears 115 which are flared outwardly from the center of the belt guiding structure 111 in the same manner as the ears 102 described in connection with the belt guiding structure 97. Each of the ears 115 supports a lateral guide roller 116 which is freely journalled thereon on an axis which is inclined from the vertical towards the center of the belt guiding structure 111. The function of the supporting and guiding rollers 114, 116 on the approach trucks 110 is identical with that of the supporting and guiding rollers previously described and is best illustrated in Fig. 8.

The approach truck 110 adjacent the loading station 20 is duplicated in the two approach trucks 110 illustrated adjacent the discharge station 120 (Figs. 3 and 4). The approach truck 110 which is closest to the discharge station 120 is seen in Fig. 3 to be higher than the adjacent approach truck 110 which connects to the truck 85. The difference in height in the first mentioned approach truck 110 does not involve any structural changes and is merely a matter of dimensioning the opposed side plates 112. The carrier belt 48 at the discharging station 120 is raised to a greater elevation at the terminal in order to facilitate the discharge of material therefrom as will appear in greater detail below.

The discharge station 120 comprises a main supporting frame 121 on which there are provided crawler traction elements 122 located one on either side of the main frame 121. A crawler driving motor 123 is mounted on the main frame 121 on each side thereof providing a driving motor for each of the traction elements 122. The armature shafts of each of the motors 123 is connected to a gear reduction means 124, the output shafts of which drive a power transmitting belt 125, one belt being provided for each of the traction elements 122 to drive the same for propelling the conveyor apparatus. The discharge station 120 includes twin driving units for the carrier belt 48, one such unit being located on each side of the main supporting frame 121. The driving units for the carrier belt 48 each includes a motor 126, the armature shaft of which connects to a flexible coupling 127 connecting to a fluid coupling 128 which, in turn, connects to a gear reduction means 129. The output shafts of the gear reduction means 129 are directed towards each other and mount the conveyor driving pulley 130. The conveyor driving pulley 130 is identical in all respects with the previously described conveyor driving pulley 29 and comprises carrier belt bearing surfaces 131 and peripheral flanges 132 at each side of the pulley 130 for engaging the bottom edges of the carrier belt 48 to maintain the same in lateral alignment on the pulley 130. A carrier belt engaging and driving sprocket gear 133 is provided on the belt driving pulley 130 engaging the transverse pins 62 on the underside of the carrier belt 48 to propel the same.

The discharge station 120 further includes a terminal belt guiding structure 134 generally similar to the terminal belt guiding structure 33 on the loading station. The belt guiding structure 134 comprises a frame 135 having opposed side plates 136 secured at one end to a transverse supporting member 137, which is secured in any suitable manner to the main frame 121 for holding the guiding structure 134 in alignment with the belt driving pulley 130. A pair of transverse braces 138 is provided at the other end of the guiding structure 134 for holding that end of the structure in proper alignment, the braces 138 being secured intermediate the opposed side plates 136 and the main frame 121. Elongated plate members 139 are secured to the side plates 136 extending vertically with respect to the plates and having portions thereof projecting beyond the edges of the plates to form ears 140 between which carrier belt supporting rollers 141 are freely journalled on horizontal axes. The ends of the ears 140 on the elongated plate members 139 are flared outwardly to form supports 142 for lateral guide rollers 143. The mounting of the lateral guide rollers 143 on the supports 142 is best illustrated in Fig. 8.

The terminal belt guiding structure 134 and the belt driving pulley 130 operate in the same manner as the belt guiding structure 33 and the driving pulley 29 found at the loading station of the novel conveyor apparatus. It is seen in Fig. 4 that the terminal belt guiding structure 134 is inclined upwardly towards the belt driving pulley 130 which is supported in a somewhat elevated position for the purpose of providing space for the location of the loading end 147 of a discharging conveyor 146 to be described below, said receiving end being disposed below the belt driving pulley 130 so that the material will dump thereinto as the material carrying pans 54 pass over and around the periphery of the pulley 130.

The discharging conveyor 146 is located behind the discharge station 120, and is mounted on and supported by the main frame 121. The discharging conveyor 146 comprises a loading end 147 located immediately below the driving pulley 130, comprising a fixed trough 148 extending upwardly and rearwardly therefrom. The fixed trough 148 terminates in a trough portion 149 which overlaps an articulated trough section 150. The articulated trough section 150 is pivotally mounted on the supporting frame 121 about a horizontal axis 151. A double acting hydraulic piston motor 152 is provided for adjusting the articulated trough section 150 to a selected position in a vertical plane, pivoting the trough section 150 about the horizontal axis 151. It will be understood that the fixed trough portion 149 overlaps the end of the articulated trough section 150 forming a slip joint permitting adjustment of the trough section 150 without any discontinuity in the discharging conveyor 146. The trough section 150 terminates in a fishtail trough portion 153 which connects with a boom trough section 154, the latter being mounted on a vertical pivot 155, permitting adjustment of the boom trough section 154 in a horizontal plane to selectively direct the discharge of the material therefrom. A pair of double acting hydraulic piston motors 156 is provided for the purpose of adjusting the boom trough section 154 of the discharging conveyor about the vertical pivot 155. The main supporting frame 121 carries a motor 157 which drives a pump 158 for supplying hydraulic fluid from the reservoir tank 159 to the hydraulic motors 152, 156 to control the adjustment of the articulated sections of the discharging conveyor 146. Suitable control means are provided at a master control station 160 for operating the discharging conveyor 146, as well as adjusting the various sections of the conveyor.

The loading end 147 of the fixed trough section 148 of the discharging conveyor 146 includes a deflector 161 for directing the material discharged from the material carrying pans 54 into the fixed trough 148. Immediately below the deflector 161 there is rotatably mounted a footshaft 162 with an idler sprocket 163 about which is entrained an endless chain 164, a portion of which is shown at the left in Figs. 4 and 5. The endless chain 164 includes a plurality of transverse flights extending to either side thereof on the trough sections of the discharging conveyor 146. The chain is driven along the trough sections of the discharging conveyor 146 with the transverse flights 165 sweeping the material fed thereto at the loading end 147 towards the boom trough section 154 for discharge at the end 166 thereof. The chain 164 is entrained about an idler sprocket 167 on a shaft 168 mounted for free rotation at the discharge end 166 of the discharging conveyor 146, the discharged material being swept over the end of the boom trough section by the transverse flights 165. The endless chain 164 passes over the idler sprocket 167 and under the boom trough section 154 where a longitudinally extending shelf 169 supports the chain and the transverse flights. In its return run the endless chain 164 is entrained over a driving sprocket 170 which is driven from a motor 171 supported on the main frame 121. Suitable gear reducing means within casing 172 connects the motor 171 to the driving sprocket 170. A shelf 173 on the main supporting frame 121 guides the chain 164 from the driving sprocket 170 to the footshaft 162 completing the run of the chain 164. It is seen that the boom trough section 154 of the discharging conveyor 146 is disposed at an elevated position so that the discharge end 166 thereof may be located over a mother conveyor belt, shuttle car, or the like for the discharge of the material thereto.

The novel conveyor apparatus as described herein provides means for conveying material through an irregular winding path, in which the conveyor apparatus includes a train of articulated trucks which can assume discrete positions in the path. Each of the trucks has means for guiding and supporting a carrier belt to which are secured material carrying pans, the carrier belt and pans being thereby guided through the winding path. The conveyor apparatus of the instant invention is self propelling for movement of the same to and from an operating location. For this purpose each of the trucks is supported by mobile means and the loading and discharge stations include crawler traction elements with motive driving means therefor which are operated from a master control station which also includes control devices for operating the conveying apparatus.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. Material conveying apparatus for moving material in a winding path having a loading station at one end and a discharge station at the other end comprising, an endless belt adapted to follow the path and extending between said loading and discharge stations, means for driving the belt in a closed run, said belt carrying a series of pans for the reception of material, means for guiding the belt in said closed run, said guiding means engaging the belt and supporting it with the material carried in the pans, a plurality of individual trucks each having a belt guiding and supporting means secured thereto, each truck including transversely extending pivot means pivotally supporting the truck and the belt guiding and supporting means carried thereby on a single axis for adjustment of the positions of the trucks and the belt guiding and supporting means on said axis in the longitudinal direction of the path, said trucks each including a longitudinally extending drawbar, pivot means connecting the ends of the drawbars to permit the trucks to assume positions in a winding path with the guiding means carried by the trucks conforming the belt to the winding path, said trucks being thereby connected one to the other in a train, each drawbar being rigid in a longitudinal direction to maintain said trucks spaced from each other, and a portion of each drawbar being flexible in a vertical direction whereby the individual trucks may assume positions vertically spaced with respect to each other with the belt guiding and supporting means assuming angular positions on said single axis.

2. Material conveying apparatus for moving material in an irregular path comprising, a belt adapted to follow the irregular path, means for driving the belt in a run, a plurality of trucks connected one to another in line for supporting the belt, each truck comprising pivot means extending transversely of the belt for supporting the truck and permitting the truck to pivot on the axis of said pivot means for adjustment of the position of the truck, each truck including means for guiding the belt in the run, said guiding means being mounted on the truck on said pivot means whereby the guiding means may pivot about said axis in the longitudinal direction of the belt to conform the belt to the irregular path, drawbar means extending longitudinally of the belt, means for rigidly securing the drawbar means to said pivot means, means for securing the belt guiding means to the drawbar means, opposite end portions of the drawbar means being flexible in a vertical direction, and articulated means connecting the drawbar means of adjacent trucks for permitting the trucks to take different positions in the irregular path with the belt guiding means conforming the belt to the irregular path.

(References on following page)

References Cited in the file of this patent

UNITED STATES PATENTS

| | | |
|---|---|---|
| 1,149,647 | Harwood | Aug. 10, 1915 |
| 1,442,219 | Howe et al. | Jan. 16, 1923 |
| 1,548,278 | Phillips et al. | Aug. 4, 1925 |
| 2,250,933 | Manierre | July 29, 1941 |
| 2,383,932 | Brunner | Sept. 4, 1945 |
| 2,420,009 | Osgood | May 6, 1947 |
| 2,525,555 | Manierre | Oct. 10, 1950 |
| 2,543,368 | Jones et al. | Feb. 27, 1951 |
| 2,609,081 | Hapman | Sept. 2, 1952 |
| 2,743,829 | Ballard | May 1, 1956 |
| 2,776,040 | Snyder | Jan. 1, 1957 |
| 2,818,962 | Horth | Jan. 7, 1958 |
| 2,818,965 | Horth | Jan. 7, 1958 |
| 2,836,283 | Horth | May 27, 1958 |
| 2,850,147 | Hill | Sept. 2, 1958 |
| 2,879,884 | Joy | Mar. 31, 1959 |

FOREIGN PATENTS

| | | |
|---|---|---|
| 611,784 | Great Britain | Nov. 3, 1948 |
| 1,108,853 | France | Sept. 14, 1955 |